(12) United States Patent
Zheng et al.

(10) Patent No.: US 9,418,307 B2
(45) Date of Patent: Aug. 16, 2016

(54) METHOD AND APPARATUS FOR SMOOTHING IMAGE

(71) Applicant: FUJITSU LIMITED, Kawasaki-shi, Kanagawa (JP)

(72) Inventors: Yun Zheng, Beijing (CN); Yuan He, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 98 days.

(21) Appl. No.: 14/598,606

(22) Filed: Jan. 16, 2015

(65) Prior Publication Data

US 2015/0206021 A1    Jul. 23, 2015

(30) Foreign Application Priority Data

Jan. 20, 2014    (CN) .......................... 2014 1 0025101

(51) Int. Cl.
| | |
|---|---|
| *G06K 9/40* | (2006.01) |
| *G06K 9/44* | (2006.01) |
| *G06T 5/00* | (2006.01) |
| *G06T 5/10* | (2006.01) |
| *G06K 9/46* | (2006.01) |

(52) U.S. Cl.
CPC ................ *G06K 9/44* (2013.01); *G06K 9/4642* (2013.01); *G06T 5/002* (2013.01); *G06T 5/005* (2013.01); *G06T 5/10* (2013.01); *G06K 2209/011* (2013.01); *G06T 2207/20021* (2013.01); *G06T 2207/20064* (2013.01); *G06T 2207/20144* (2013.01); *G06T 2207/30176* (2013.01)

(58) Field of Classification Search
CPC ............ G06K 9/44; G06T 5/001; G06T 5/20; H04N 7/26888; H04N 7/26377; H04N 7/26771
See application file for complete search history.

(56) References Cited

U.S. PATENT DOCUMENTS

| | | | | |
|---|---|---|---|---|
| 4,945,502 | A * | 7/1990 | Kwon ....................... | G06T 5/20 348/607 |
| 5,010,504 | A * | 4/1991 | Lee ........................... | H04N 5/21 348/607 |
| 5,467,404 | A * | 11/1995 | Vuylsteke ................ | G06T 5/007 382/128 |
| 7,408,986 | B2 * | 8/2008 | Winder ................... | G06T 7/2053 348/699 |
| 7,881,554 | B2 * | 2/2011 | Castorina ................ | G06T 5/008 382/264 |
| 7,889,950 | B2 * | 2/2011 | Milanfar .................. | G06K 9/40 348/441 |
| 8,265,412 | B2 * | 9/2012 | Ishiga ..................... | H04N 1/409 348/252 |
| 8,917,952 | B2 * | 12/2014 | Yang ...................... | G06F 17/153 382/279 |
| 8,948,539 | B2 * | 2/2015 | Meyers ...................... | G06T 5/50 250/208.1 |
| 8,977,012 | B2 * | 3/2015 | Ioffe .................. | G06K 9/00261 382/118 |
| 2015/0206021 | A1 * | 7/2015 | Zheng ....................... | G06K 9/44 382/268 |

* cited by examiner

*Primary Examiner* — Amir Alavi
(74) *Attorney, Agent, or Firm* — Staas & Halsey LLP

(57) ABSTRACT

A method and apparatus for smoothing an image representing foreground or background. The method comprises: dividing the image in a specified granularity; for a block divided containing a blank pixel and a non-blank pixel, modifying a value of the blank pixel to a value obtained from a value of the non-blank pixel to obtain a filled block; obtaining the block smoothed by performing singular value decomposition on a matrix of pixels of the filled block, wherein values in the matrix of pixels of the block smoothed is calculated as a product of the obtained singular value, a left singular vector, and a transpose of a right singular vector; and for each of the non-blank pixels in the block smoothed, restoring the values of the non-blank pixels to initial values before the filling step, so as to obtain a reconstructed block.

11 Claims, 8 Drawing Sheets

METHOD AND APPARATUS FOR SMOOTHING IMAGE

CROSS-REFERENCE TO RELATED APPLICATION(S)

This application claims the benefit of Chinese Patent Application No. 201410025101.4, filed on Jan. 20, 2014, the disclosure of which is incorporated herein by reference.

TECHNICAL FIELD

The present disclosure generally relates to a field of image processing, and particularly to a method of and apparatus for smoothing an image representing foreground or background by performing data filling on the image.

BACKGROUND ART

In some image processing, some images (e.g. document images) are divided into three layers of images, i.e. a foreground image, a background image and a mask image. Then, processing may be performed on the three layers of images based upon characteristics of the three layers of images respectively, thereby producing a better processing effect.

However, the background image and the foreground image are generally not smoothed images. For example, the background image possibly does not only contain image pixels for background, but blank pixels are contained at a foreground pixel position in the background image. On the contrary, the foreground image possibly does not only contain image pixels for foreground, but blank pixels are contained at a background pixel position in the foreground image. Sometimes, for example, in order to improve a data compression effect, values of blank pixels in a background image and/or a foreground layer image are necessarily modified (also called filling), so as to obtain a smoothed background image and a smoothed foreground image.

Traditionally, image filling is performed directly in a pixel domain by using an average value of pixels nearby a blank pixel region. A filled image obtained from this method is not smoothed enough.

In addition, a method based upon Discrete Cosine Transform (DCT) and wavelet transform is known, and it performs DCT and wavelet transform and fills an image in a frequency domain. This method is generally very slow, and quantization parameters will influence the quality of filling.

Thus, it is desired to propose a technique capable of solving the above problem.

SUMMARY OF THE INVENTION

Brief descriptions of the present disclosure will be made below, so as to provide basic understanding to some aspects of the present disclosure. It should be understood that the brief descriptions are not enumerative descriptions of the present disclosure, and they neither intend to determine the key or essential parts of the present disclosure nor intend to limit the scope of the present disclosure, but aim only to give some concepts in a simplified form, so as to serve as a preamble of more detailed descriptions later.

A main object of the present disclosure is to provide a method and apparatus for smoothing an image representing foreground or background by performing data filling on the image.

According to one aspect of the disclosure, a method for smoothing an image representing foreground or background by performing data filling on the image is provided, comprising: a dividing step of dividing the image into a plurality of blocks in a specified granularity; a filling step of, for a block of the plurality of blocks containing a blank pixel and a non-blank pixel, modifying a value of the blank pixel of the block to a value which is obtained on the basis of a value of the non-blank pixel, so as to obtain a filled block; a smoothing step of obtaining the block in which values of pixels are smoothed by performing singular value decomposition on a matrix of pixels of the filled block, wherein values in the matrix of pixels of the block in which values of pixels are smoothed is calculated as a product of the obtained singular value, a left singular vector and a transpose of a right singular vector; and a reconstructing step of, for each of the non-blank pixels in the block in which values of pixels are smoothed, restoring the values of the non-blank pixels to initial values of the non-blank pixels before the filling step, so as to obtain a reconstructed block.

According to a further aspect of the present disclosure, an apparatus for smoothing an image representing foreground or background by performing data filling on the image is provided, comprising: a dividing part, configured to divide the image into a plurality of blocks in a specified granularity; a filling part, configured to, for a block of the plurality of blocks containing a blank pixel and a non-blank pixel, modify a value of the blank pixel of the block to a value which is obtained on the basis of a value of the non-blank pixel, so as to obtain a filled block; a smoothing part, configured to obtain the block in which values of pixels are smoothed by performing singular value decomposition on a matrix of pixels of the filled block, wherein values in the matrix of pixels of the block in which values of pixels are smoothed is calculated as a product of the obtained singular value, a left singular vector and a transpose of a right singular vector; a reconstructing part, configured to, for each of the non-blank pixels in the block in which values of pixels are smoothed, restore the values of the non-blank pixels to an initial values of the non-blank pixels before the filling is performed by the filling part, so as to obtain a reconstructed block; and a control part, configured to control the dividing part, the filling part, the smoothing part and the reconstructing part to perform respective operations.

In addition, embodiments of the present disclosure further provide a computer program for implementing the above method.

In addition, embodiments of the present disclosure further provide a computer program product in the form of at least a computer-readable medium, on which a computer program code for implementing the above method is recorded.

Through the following detailed descriptions of the best embodiment of the present disclosure combined with the appended drawings, these and other advantages of the present disclosure will become more apparent.

BRIEF DESCRIPTION OF THE DRAWINGS

With reference to the descriptions of the embodiments of the present disclosure combined with the appended drawings below, the above and other objects, features and advantages of the present disclosure would be understood more easily. The components in the appended drawings aim only to show the principle of the present disclosure. In the appended drawings, identical or corresponding technical features or components will be denoted by using identical or corresponding reference signs.

DETAILED DESCRIPTION OF THE EMBODIMENTS

Embodiments of the present disclosure will be described with reference to the appended drawings below. Elements and features described in one figure or one embodiment of the present disclosure may be combined with elements and features as shown in one or more other figures or embodiments. It should be noted that, for the sake of clarity, representations and descriptions of components and processing known to those ordinarily skilled in the art which are irrelevant to the disclosure are omitted in the appended drawings and descriptions thereof.

Figure 1:
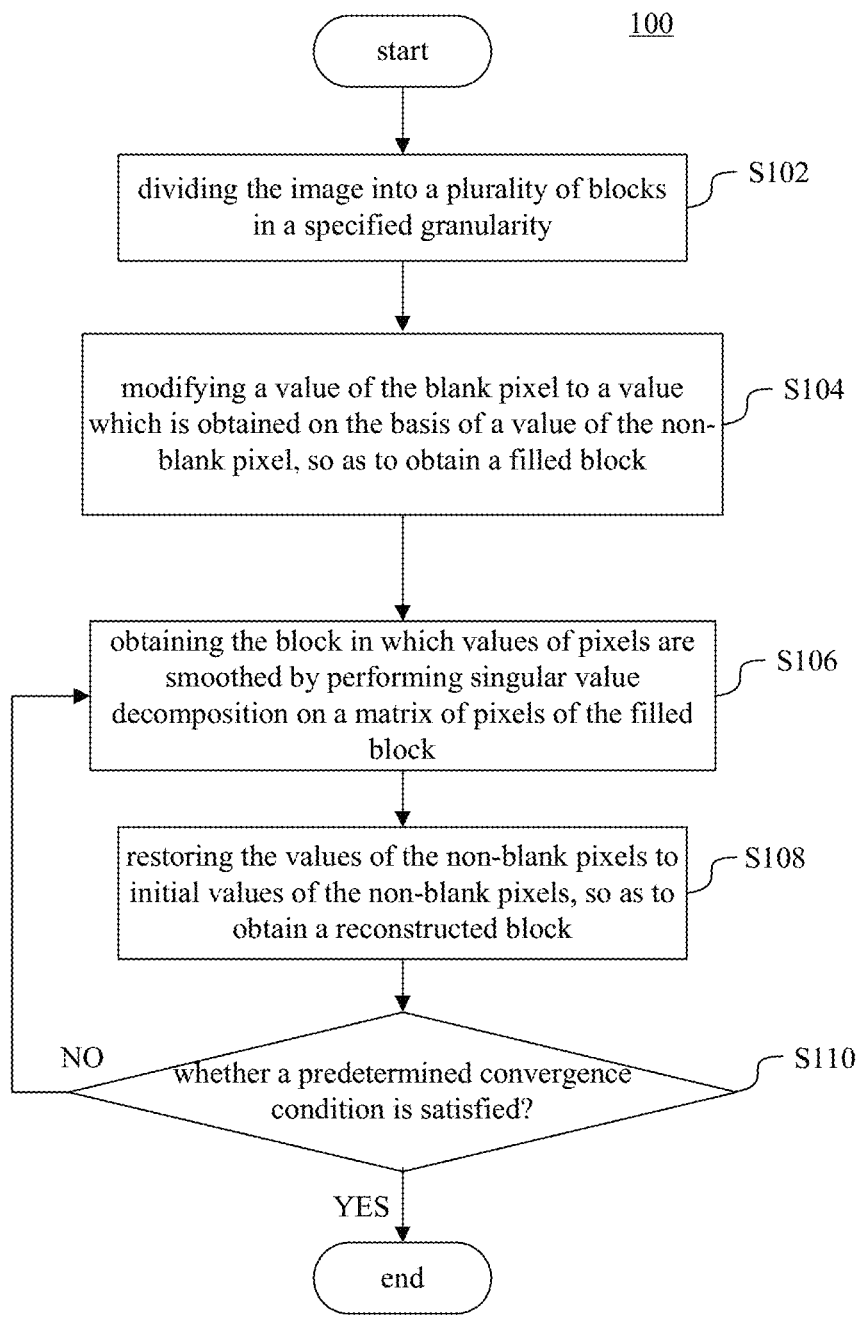
FIG. 1 is a flowchart illustrating a method of smoothing an image according to an embodiment of the present disclosure.

FIG. 1 is a flowchart illustrating an image smoothing method 100 according to an embodiment of the present disclosure.

In the method as shown in FIG. 1, an image is smoothed by performing data filling on an image representing foreground or background, wherein, the image representing foreground refers to a foreground layer image, and the image representing background refers to a background layer image.

As shown in FIG. 1, in Step S102, the image is divided into a plurality of blocks in a specified granularity.

For example, the specified granularity may be 4×4 pixels, such that a size of each block obtained by dividing is 4×4 pixels. However, it would be readily understood that 4×4 pixels is only to an example, and the specified granularity may be in other sizes, for example 8×8 pixels, as needed.

Figure 2:
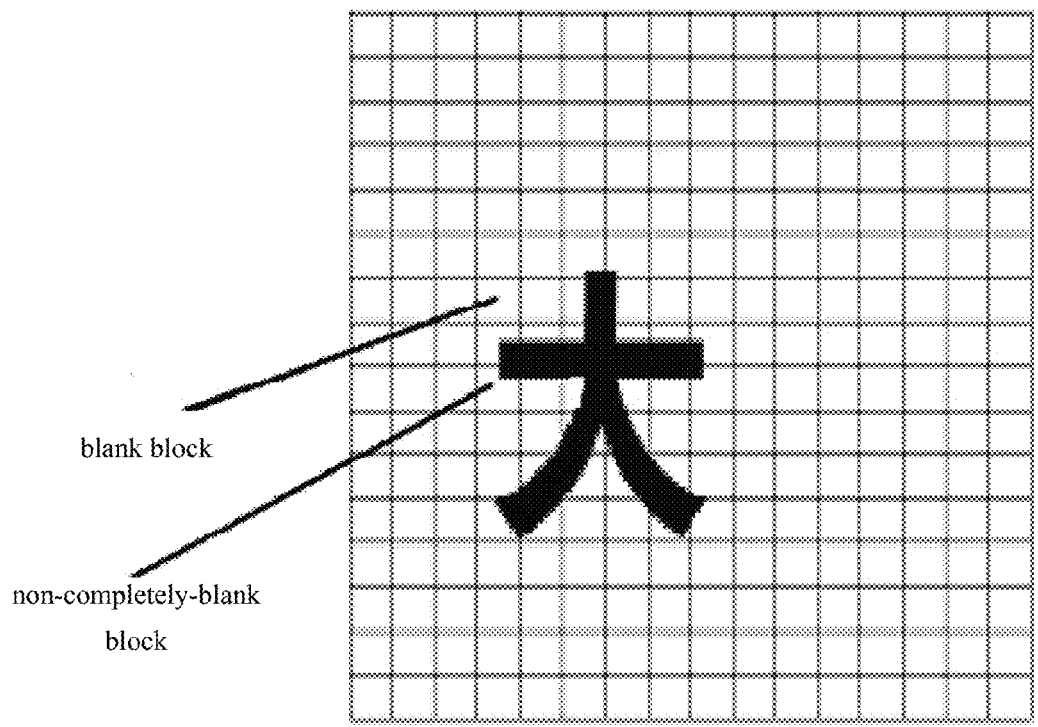
FIG. 2 is an exemplary view illustrating a plurality of blocks obtained through dividing in a specified granularity.

FIG. 2 is an exemplary view illustrating a plurality of blocks obtained through dividing in a specified granularity, wherein each block includes several pixels, wherein the plurality of blocks obtained by dividing include both a blank block and a non-completely-blank block (i.e. blocks containing both a blank pixel and a non-blank pixel). In the blank block, all pixels are blank, while in the non-completely-blank block, both non-blank pixels and blank pixels exist. Although not shown in FIG. 2, it should be understood that there also possibly exists such a block that only non-blank pixels exist in the block, and such a block is not necessarily subjected to data filling.

Taking the background layer image as an example, the background layer image contains image pixels for background only, while blank pixels are at a foreground pixel position in the background layer image. In this case, a non-completely-blank block possibly exists at a boarder position between a background pixel position and the foreground pixel position, while a non-blank block possibly exists at the background pixel position, and a blank block possibly exists at the foreground pixel position.

Similarly, the foreground layer image contains image pixels for foreground only, while blank pixels are at a background pixel position in the foreground layer image. In this case, a non-completely-blank block possibly exists at a boarder position between a foreground pixel position and the background pixel position, while a non-blank block possibly exists at the foreground pixel position, and a blank block possibly exists at the background pixel position.

In Step 104, for a block of the plurality of blocks containing both a blank pixel and a non-blank pixel which are obtained through dividing in step S102, i.e. the non-completely-blank block, a value of the blank pixel of the block is modified to a value which is obtained on the basis of a value of the non-blank pixel, so as to obtain a filled block. The value which is obtained on the basis of the value of the non-blank pixel may be an average value of the non-blank pixel. However, it should be understood that the value which is obtained on the basis of the value of the non-blank pixel is not limited to the average value, but may be a function of the value of the non-blank pixel and the position of the non-blank pixel.

In Step S106, the block in which values of pixels are smoothed is obtained by performing singular value decomposition on a matrix of pixels of the filled block which is obtained in Step S104, wherein values in the matrix of pixels of the block in which values of pixels are smoothed is calculated as a product of the obtained singular value s, left singular vector u and the transpose of right singular vector v.

Specifically, assuming that the matrix of pixels to which the filled block corresponds is B, the left singular vector u may be calculated as follows:
assuming $T=B*B'$,
for $i=1:3$ $$u=T*u/norm(u)$$

end wherein, B' represents the transpose of B; $i=1:3$ represents that the number of cycles is 3, but the number of cycles is not limited thereto, and other numbers of cycles may be set as needed; and norm(u) represents a mode of the left singular vector u. In performing cycles, an initial value of u is random.

The singular value s may be calculated as follows:

$$s=\text{sqrt}((T*u)(0)/u(0))$$

wherein, sqrt( ) represents a square root function, and "0" represents a first element of a corresponding matrix. However, it should be understood that, without the necessity of taking a value of the first element, a value of any element may be taken.

The right singular vector v may be calculated as follows:
assuming $T=B'*B$,
for $i=1:3$ $$u=T*v/norm(v)$$

end wherein, B' represents the transpose of B; $i=1:3$ represents that the number of cycles is 3, but the number of cycles is not limited thereto, and other numbers of cycles may be set as needed; and norm(v) represents a mode of the right singular vector v. In performing cycles, an initial value of v is random.

An approximate pixel value matrix corresponding to the block in which values of pixels are smoothed is $B_a=s \times u \times v'$, wherein the subscript for $B_a$ represents approximate, and v' represents the transpose of the right singular vector v.

In Step S108, for each of the non-blank pixels in the block in which values of pixels are smoothed as obtained in Step S106, the values of the non-blank pixels are restored to initial values of the non-blank pixels before the filling step S104, so as to obtain a reconstructed block. This is because that, for the block in which values of pixels are smoothed as obtained in Step S106, both the values of the blank pixels and the non-blank pixels are calculated as a product of the obtained singular value, the left singular vector and the transpose of right singular vector. Thus, the initial values of the non-blank pixels are necessarily restored, while maintaining the decomposition calculation result of the singular values of the blank pixels. Specifically, the values of the non-blank pixels in the approximate pixel matrix $B_a$ are restored to initial values of the non-blank pixels before the filling step S104, so as to obtain a reconstructed block.

In Step S110, whether a predetermined convergence condition is satisfied is judged.

For example, whether a mean-square deviation of pixels of two blocks as obtained in two successive iterations is less than a predetermined value may be judged. If the mean-square deviation is less than the predetermined value, it is regarded that the convergence condition is satisfied; and otherwise, it is regarded that the convergence condition is not satisfied.

If it is judged in Step S110 that the convergence condition is satisfied, the processing ends. If it is judged in Step S110 that the convergence condition is not satisfied, the processing returns to Step S106. In this case, in Step S106, the block in which pixels values are smoothed by performing singular value decomposition on a matrix of pixels of the reconstructed block as obtained in step S108.

Figure 3:
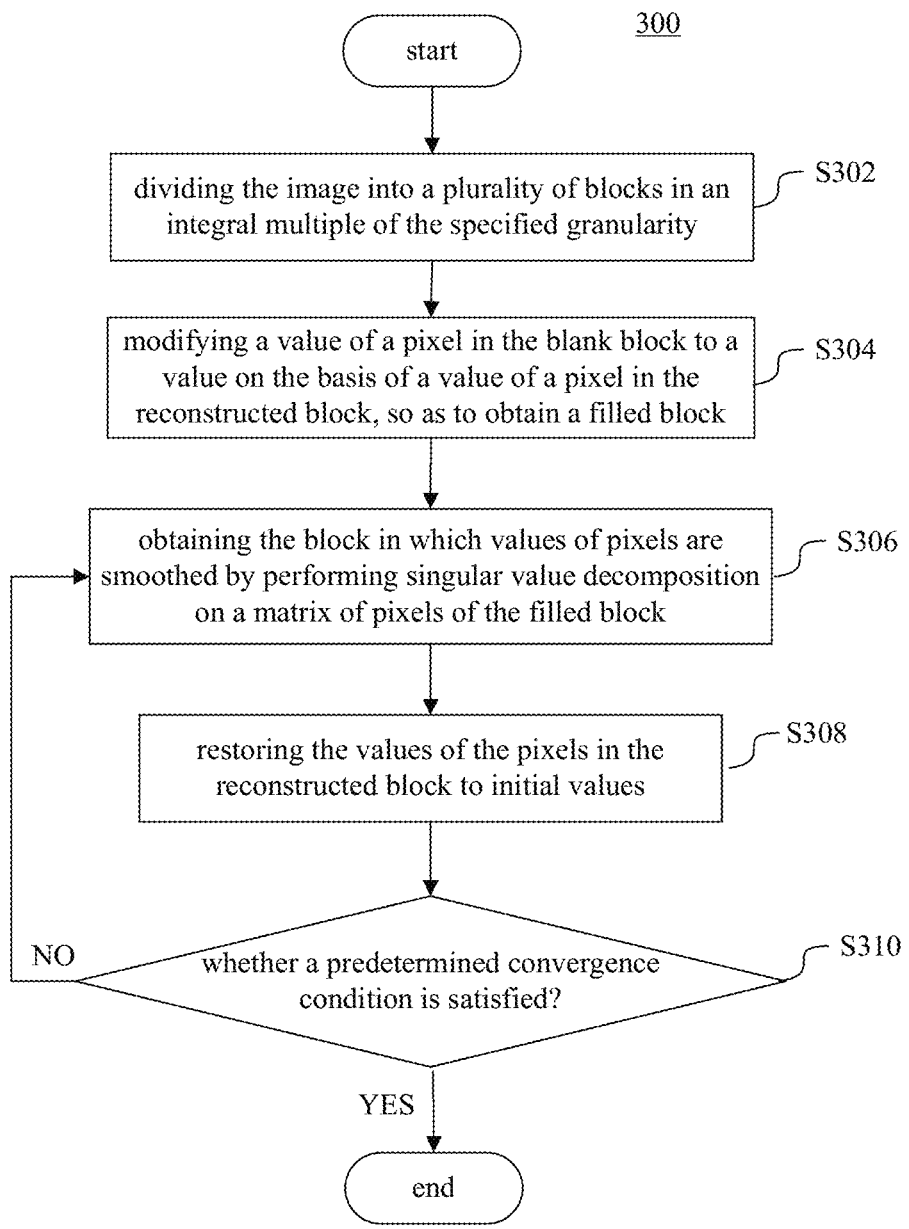
FIG. 3 is a flowchart illustrating a method of performing image smoothing in an integral multiple of the specified granularity according to the embodiment of the present disclosure.
Figure 4:
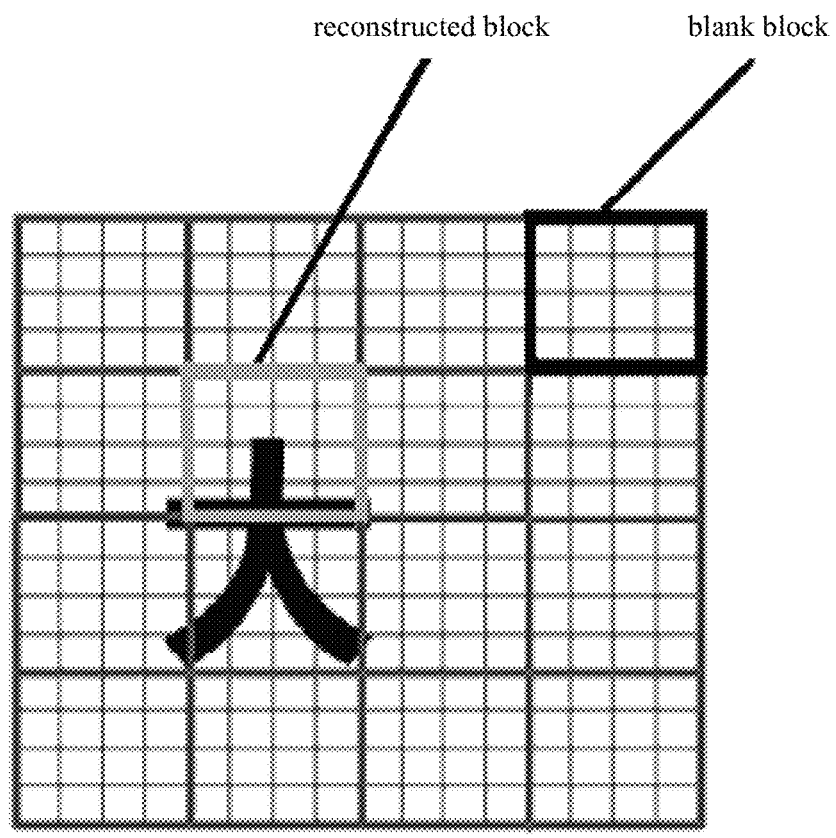
FIG. 4 is an exemplary view illustrating a plurality of blocks obtained through dividing in an integral multiple of the specified granularity.

FIG. 3 is a flowchart illustrating a method 300 of performing image smoothing by using an integral multiple of the specified granularity according to the embodiment of the present disclosure.

The processing in FIG. 3 is similar to the processing in FIG. 1, except for differences in performing the dividing step by using an integral multiple of the specified granularity, and performing the filling step, smoothing step and reconstructing step by using a blank block of the plurality of blocks which are obtained by performing dividing in the specified granularity and the reconstructed block obtained in the processing in FIG. 1 as the blank pixel and non-blank pixel respectively.

As shown in FIG. 3, in Step S302, the image may be divided into a plurality of blocks by using an integral multiple of the specified granularity. A size of a block obtained in such a way is an integral multiple of a size of a block obtained by performing dividing in the specified granularity.

In Step S304, a value of a pixel in the blank block is modified to a value which is obtained on the basis of a value of a pixel in the reconstructed block obtained in the processing in FIG. 1, so as to obtain a filled block.

In Step S306, the block in which values of pixels are smoothed is obtained by performing singular value decomposition on a matrix of pixels of the filled block In Step S308, the values of the pixels in the reconstructed block obtained in the processing in FIG. 1 are restored to initial values before Step 306 is performed, so as to obtain a block after the reconstruction of this time.

In Step S310, it is judged whether the convergence condition is satisfied. For example, whether a mean-square deviation of pixels of two reconstructed blocks as obtained in two successive iterations is less than a predetermined value may be judged. If the mean-square deviation is less than the predetermined value, it is regarded that the convergence condition is satisfied; and otherwise, it is regarded that the convergence condition is not satisfied.

To smooth the whole image, the dividing step, the filling step, smoothing step and reconstructing step may be performed by increasing an integral multiple of the specified granularity progressively, until completion of processing of all pixels in the image. In other words, processing is performed stage by stage by continuously increasing the granularity used when performing the dividing on the image.

Preferably, the image may be converted from an initial image presentation space (for example, RGB space) to a YCbCr image representation space, and then down sampling is performed on an image in at least one dimension of the dimensions Cb and Cr, so as to obtain a reduced image in the at least one dimension. Next, processing described with FIGS. 1 to 4 is performed on the image in the dimension Y, the reduced image in the dimension Cb and the reduced image in the dimension Cr respectively. For example, resolutions of the images in the dimensions Cb and Cr may be reduced to ½ of initial resolutions. However, it should be understood that the images in the dimensions Cb and Cr are not necessarily reduced to the same resolution but may be reduced to different resolutions as needed. For example, the image in the dimension Cb may be reduced to ½ of the initial resolution, while reducing the image in the dimension Cr to ¼ of the initial resolution. Compared with the image in the dimension Y, the image in the dimension Cb and the image in the dimension Cr are of less importance, so even if the image in the dimension Cb and the image in the dimension Cr are reduced, processing quality will not be influenced greatly, while processing speed will be increased greatly.

After the processing described with FIGS. 1 to 4 ends, initial sizes of the image in the dimension Cr and the image in the dimension Cb may be restored by performing up-sampling on the reduced image in the dimension Cr and the reduced image in the dimension Cb, and then, the images, size of which are restored, may be converted from the YCbCr image representation space back to the initial image presentation space.

In addition, alternatively, Gaussian smoothing may be performed on the images ultimately obtained, so as to improve the smoothness of the images.

The foregoing describes the image smoothing method according to the embodiment of the present disclosure. The image smoothing apparatus according to the embodiment of the present disclosure will be described below. It should be understood that those contents described for the method likewise apply to the corresponding image smoothing apparatus. Thus, repeated descriptions will be omitted for the sake of conciseness.

Figure 5:
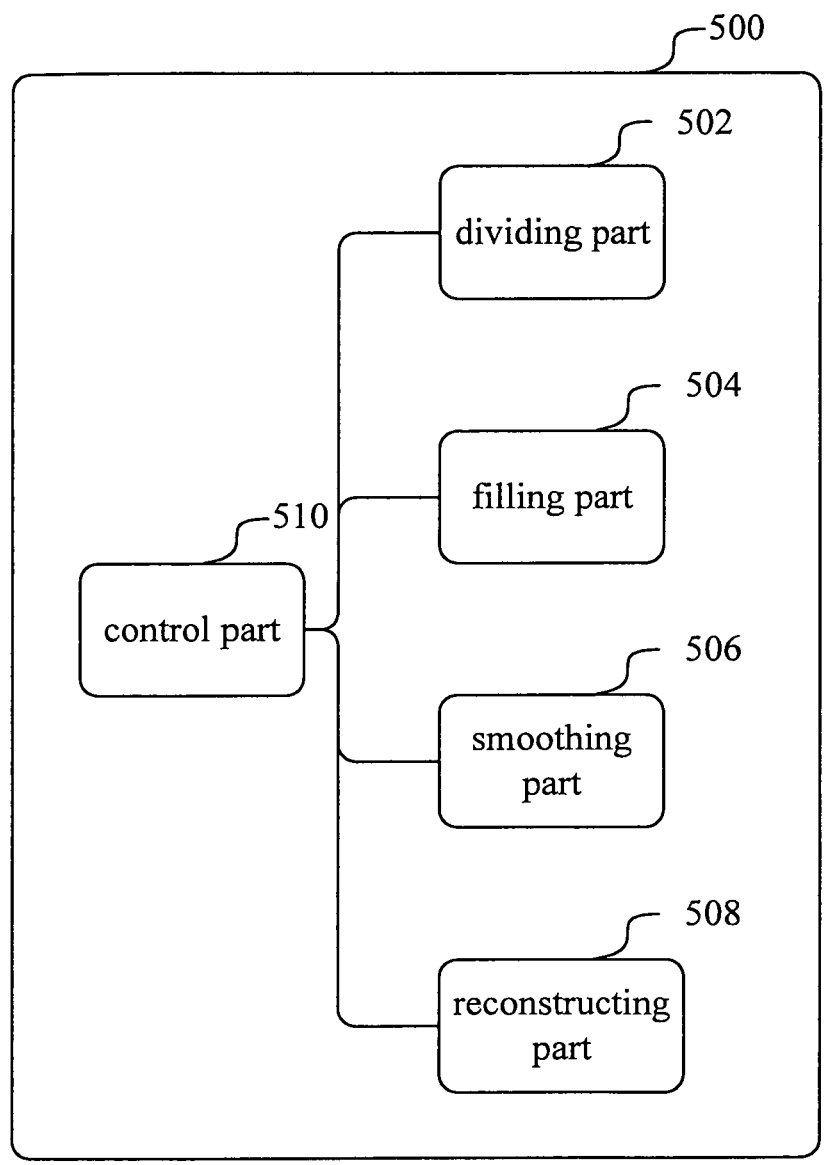
FIG. 5 is a configuration block diagram illustrating an apparatus for smoothing an image according to one embodiment of the present disclosure.

FIG. 5 is a configuration block diagram illustrating an image smoothing apparatus 500 according to one embodiment of the present disclosure. The image smoothing apparatus 500 smoothes an image representing foreground or background by performing data filling on the image.

As shown in FIG. 5, the image smoothing apparatus 500 comprises a dividing part or divider 502, a filling part or filler 504, a smoothing part or smoother 506, a reconstructing part or reconstructor 508 and a control part or controller 510.

Under the control of the control part 510, the dividing part 502 divides an image into a plurality of blocks in a specified granularity. Under the control of the control part 510, the filling part 504, for a block of the plurality of blocks which are obtained by dividing by the dividing part 502 containing both a blank pixel and a non-blank pixel, modifies a value of the blank pixel of the block to a value which is obtained on the basis of a value of the non-blank pixel, so as to obtain a filled block. Under the control of the control part 510, the smoothing part 506, obtains the block in which values of pixels are smoothed by performing singular value decomposition on a matrix of pixels of the block filled by the filling part 504, wherein values in the matrix of pixels of the block in which values of pixels are smoothed is calculated as a product of the obtained singular value, the left singular vector and the transpose of the right singular vector. Under the control of the control part 510, the reconstructing part 508, for each of the non-blank pixels in the block in which values of pixels are smoothed which is obtained by the filling part 506, restores the values of the non-blank pixels to an initial values of the non-blank pixels before the filling is performed by the filling part 506, so as to obtain a reconstructed block. The control part 510 controls the dividing part 502, the filling part 504, the smoothing part 506 and the reconstructing part 508 to perform respective operations.

Preferably, the control part 510 may be configured to control the smoothing part 506 and the reconstruction part 508 to perform operations iteratively, until a predetermined convergence condition is satisfied.

For example, the control part 510 may judge whether a mean-square deviation of pixels of two reconstructed blocks as obtained in two successive iterations is less than a predetermined value. If the mean-square deviation is less than the predetermined value, it is regarded that the convergence condition is satisfied; and otherwise, it is regarded that the convergence condition is not satisfied.

Preferably, the control part 510 may be configured to control the dividing part 502 to perform an operation by using an integral multiple of the specified granularity as the specified granularity, and to control the filling part 504, the smoothing part 506 and the reconstructing part 508 to perform operations by using the blank block of the plurality of blocks which are obtained by performing dividing in the specified granularity and the reconstructed block as the blank pixel and non-blank pixel respectively.

Preferably, the control part 510 may be configured to control the smoothing part 506 and the reconstruction part 508 to perform operations iteratively, until a predetermined convergence condition is satisfied.

Preferably, the control part 510 may be configured to control the dividing part 502, the filing part 504, the smoothing part 506 and the reconstructing part 508 to perform operations by increasing the integral multiple progressively, until all pixels of the image are processed.

Figure 6:
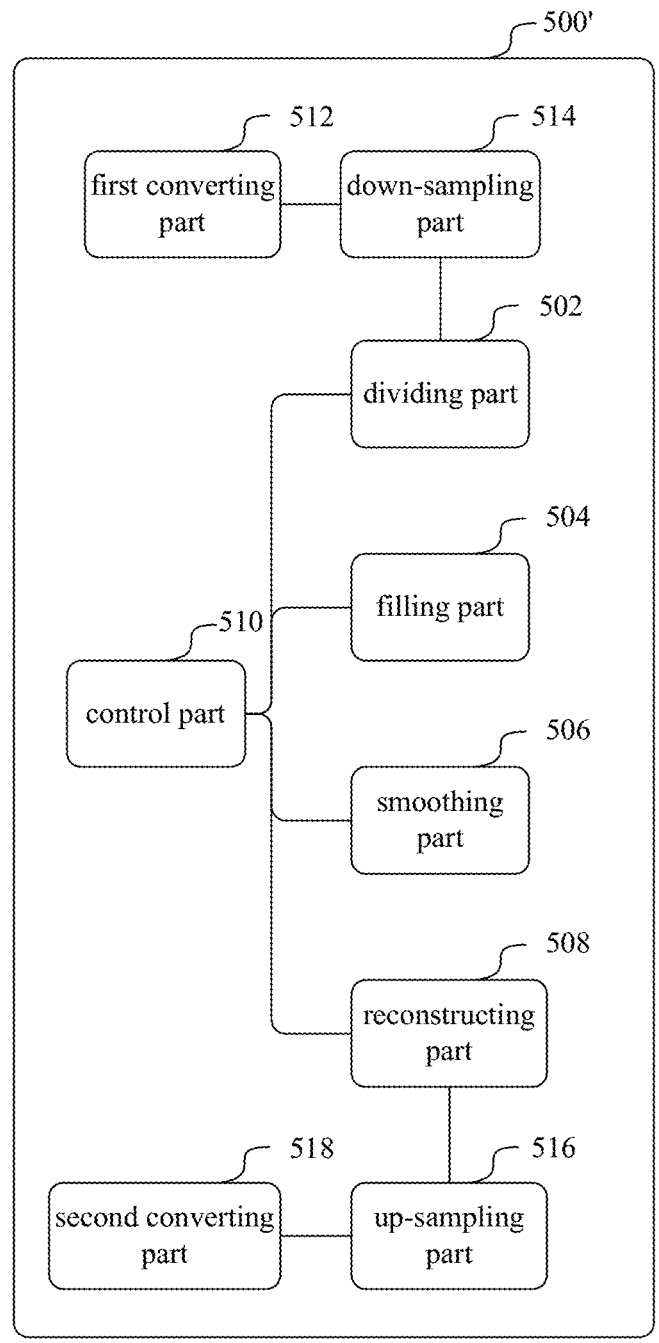
FIG. 6 is a configuration block diagram illustrating an apparatus for smoothing an image according to another embodiment of the present disclosure.

FIG. 6 is a configuration block diagram illustrating an image smoothing apparatus 500' according to another embodiment of the present disclosure.

The image smoothing apparatus 500' as shown in FIG. 6 differs from the image smoothing apparatus 500 as shown in FIG. 5 in that the image smoothing apparatus 500' may further comprise a first converting part 512, a down-sampling part 514, an up-sampling part 516 and a second converting part 518.

The first converting part 512 may convert the image from an initial image presentation space to a YCbCr image representation space. The down-sampling part 514 may perform down-sampling on an image in at least one dimension of the dimensions Cb and Cr, so as to obtain a reduced image in a corresponding dimension, and send the reduced image to the dividing part 502.

The control part 510 controls the dividing part 502, the filing part 504, the smoothing part 506 and the reconstructing part 508 to perform respective operations. The dividing part 502 may, under the control of the control part 510, divide an image obtained by performing processing by the down-sampling part 514 into a plurality of blocks in a specified granularity. The filling part 504 may, under the control of the control part 510, for a block of the plurality of blocks which are obtained by dividing by the dividing part 502 containing both a blank pixel and a non-blank pixel, modify a value of the blank pixel of the block to a value which is obtained on the basis of a value of the non-blank pixel, so as to obtain a filled block. The smoothing part 506 may, under the control of the control part 510, obtain the block in which values of pixels are smoothed by performing singular value decomposition on a matrix of pixels of the block filled by the filling part 504, wherein values in the matrix of pixels of the block in which values of pixels are smoothed is calculated as a product of the obtained singular value, the left singular vector and the transpose of the right singular vector. The reconstructing part 508 may, under the control of the control part 510, for each of the non-blank pixels in the block in which values of pixels are smoothed which is obtained by the filling part 506, restore the values of the non-blank pixels to an initial values of the non-blank pixels before the filling is performed by the filling part 506, so as to obtain a reconstructed block.

The up-sampling part 516 may restore an initial size of the image reconstructed by the reconstructing part 508 by performing up-sampling on the image reconstructed by the reconstructing part 508. The second converting part 518 may convert the image, size of which is restored, from the YCbCr image representation space back to the initial image presentation space.

Figure 7:
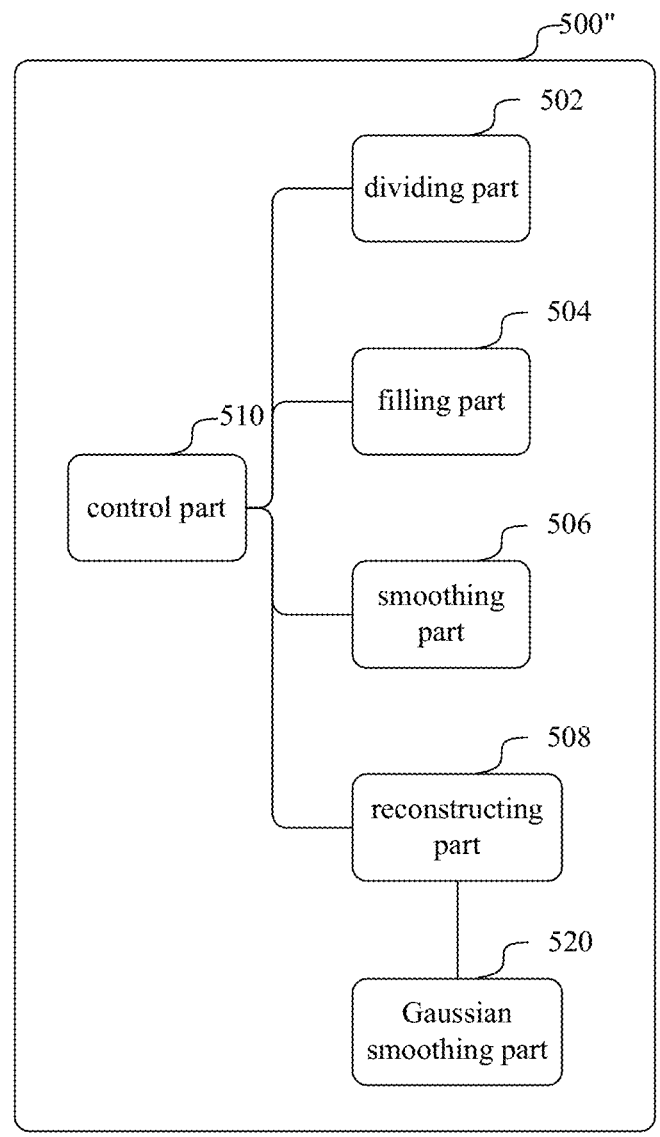
FIG. 7 is a configuration block diagram illustrating an apparatus for smoothing an image according to a further embodiment of the present disclosure.

FIG. 7 is a configuration block diagram illustrating an image smoothing apparatus 500" according to a further embodiment of the present disclosure.

The image smoothing apparatus 500" as shown in FIG. 7 differs from the image smoothing apparatus 500 as shown in FIG. 5 in that the image smoothing apparatus 500" may further comprise a Gaussian smoothing part 520.

The Gaussian smoothing part 520 may perform Gaussian smoothing on the image reconstructed by the reconstructing part 508, thereby making it possible to obtain an image having a higher smoothness degree.

The fundamental principle of the present disclosure is described above in combination with detailed embodiments. However, it should be noted that: those ordinarily skilled in the art would appreciate that all the steps or components of or any step or component of the method and the apparatus according to the present disclosure can be embodied in the form of hardware, firmware, software or combinations thereof in any computing device (including a processor, a storage medium, etc.) or any network of computing devices, which would be carried out by those ordinarily skilled in the art by applying their basic programming skills on the basis of the descriptions of the present disclosure.

Thus, the object of the present disclosure can also be achieved by running a program or a group of programs on any computing device. The computing device may be a well-known universal device. Thus, the object of the present disclosure may also be achieved only by providing a program product which includes a program code carrying out the method or apparatus. That is, such a program product also constitutes the present disclosure, and a storage medium storing such a program product also constitutes the present disclosure. Obviously, the storage medium may be any well-known storage medium or any storage medium that will be developed in the future.

Figure 8:
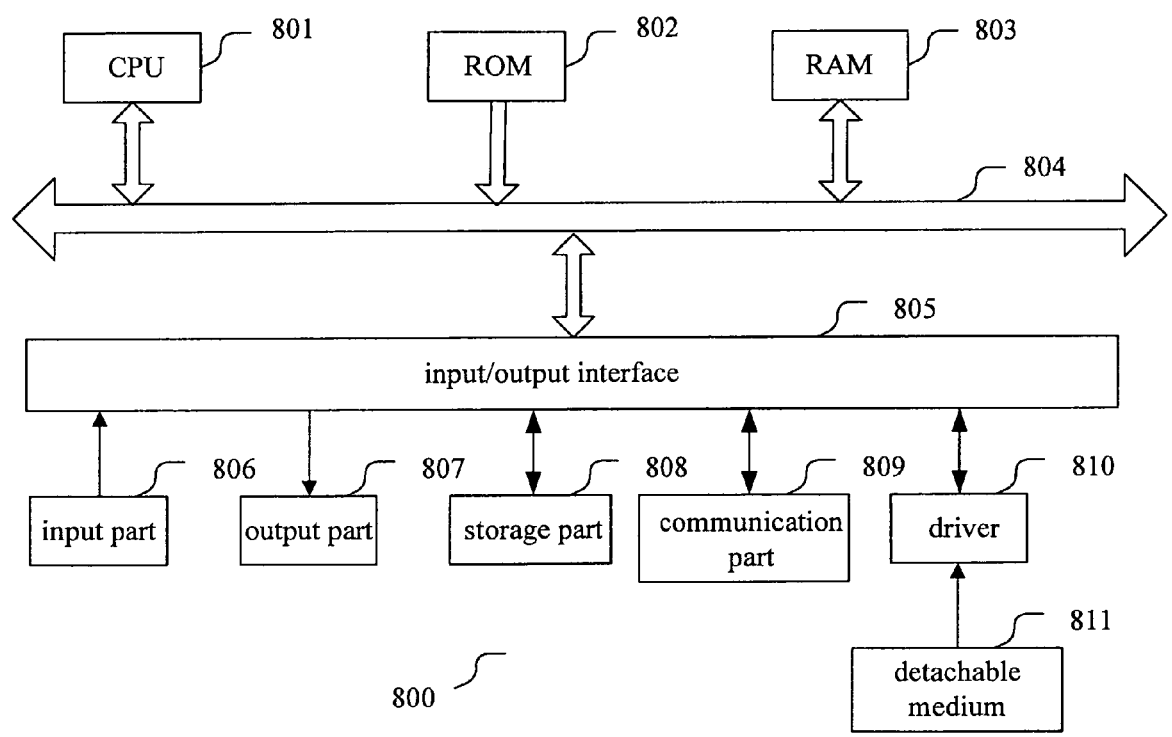
FIG. 8 is an exemplary structural block diagram illustrating a computing device that can be used for implementing the method of and the apparatus for smoothing the image according to the present disclosure.

In the case of carrying out the embodiments of the present disclosure by software and/or firmware, a program constituting the software is installed into a computer having a dedicated hardware structure, e.g. a universal computer 800 as shown in FIG. 8, from a storage medium or a network. When installed with various programs, the computer can perform various functions and so on.

In FIG. 8, a central processing unit (CPU) 801 performs various processing according to a program stored in a Read-Only Memory (ROM) 802 or a program uploaded from a storage part 808 to a Random Access Memory (RAM) 803. In the RAM 803, data needed when the CPU 801 performs various processing or the like is also stored as required. The CPU 801, the ROM 802 and the RAM 803 are linked to each other via a bus 804. An input/output interface 805 is also linked to the bus 804.

The following components are linked to the input/output interface 805: an input part 806 (including a keyboard, a mouse and the like), an output part 807 (including a display, such as a Cathode Ray Tube (CRT), a Liquid Crystal Display (LCD) and the like, as well as a loudspeaker and the like), the storage part 808 (including a hard disk and the like), and a communication part 809 (including a network interface card such as an LAN card, a modem and the like). The communication part 809 performs communication processing over a network such as Internet. According to requirements, a driver 810 may also be linked to the input/output interface 805. A detachable medium 811 such as a magnetic disk, a CD, a magnetooptical disk, a semiconductor memory and so on is installed on the driver 810 according to requirements, such that a computer program read therefrom is installed in the storage part 808 according to requirements.

In the case of carrying out the above series of processing by software, a program constituting the software would be installed from a network such as Internet or a storage medium such as the detachable medium 811.

Those skilled in the art would appreciate that such a storage medium is not limited to the detachable medium 811 storing a program and distributed separately from the apparatus to provide the program to a user as shown in FIG. 8. Examples of the detachable medium 811 include a magnetic disk (registered trademark), a CD (including a CD Read-Only Memory (CD-ROM) and a Digital Versatile Disk (DVD)), a magenetooptical disk (including a Mini Disk (MD)) (registered trademark) and a semiconductor memory. Or, the storage medium may be a hard disk included in the ROM 802 and the storage part 808, etc., in which a program is stored, and which is distributed together with the apparatus including it to a user.

The present disclosure further proposes a program product storing a machine-readable instruction code. When being read and executed by a machine, the instruction code may carry out the above method according to the embodiment of the present disclosure.

Correspondingly, a storage medium for carrying the program product storing the machine-readable instruction code is also included in the disclosure of the present disclosure. The storage medium includes but is not limited to a floppy disk, an optical disk, a magnetooptical disk, a memory card, a memory stick and so on.

Those ordinarily skilled in the art would appreciate that the examples listed herein are exemplary, and the disclosure is not limited thereto.

In the Specification, terms such as "first", "second", "nth" and so on are used to distinguish the described features from each other in terms of wording, so as to describe the present disclosure clearly, and hence shall not be regarded as covering any limitative meaning.

As an example, the respective steps of the above method and the respective constituent modules and/or units of the above apparatus may be embodied as software, firmware, hardware or combinations thereof, and serve as a part of a corresponding apparatus. The specific means or manner that can be used when configuring the respective constituent modules and units in the above apparatus by means of software, firmware, hardware or combinations thereof is well-known to those skilled in the art, and will not be redundantly described herein, As an example, in the case of implementation by software or firmware, a program constituting the software may be installed into a computer having a dedicated hardware structure (for example the universal computer 800 as shown in FIG. 8) from a storage medium or a network. When installed with various programs, the computer can perform various functions and so on.

In the above descriptions of the detailed embodiments of the present disclosure, features described and/or shown for one embodiment may be used according to the same or similar way in one or more other embodiments, be combined with features in other embodiments, or substitute features in other embodiments.

It should be emphasized that the term "comprise/include" when used in the text refers to existence of a feature, an element, a step or an assembly, without excluding existence or addition of one or more other features, elements, steps or assemblies.

In addition, the method according to the present disclosure is not limited to be carried out in the temporal order described in the Specification, but may also be carried out sequentially, in parallel or independently in other temporal orders. Therefore, the order of carrying out the method described in the present disclosure fails to constitute a limitation to the technical scope of the present disclosure.

Although the present disclosure and advantages thereof are already described above, it should be understood that various alterations, substitutions and modifications may be carried out without departing from the spirit and scope of the present disclosure which are defined by the appended claims. In addition, the scope of the present disclosure is not limited only to the specific embodiments of the processes, the apparatuses, the means, the methods and the steps as described in the Specification. As would be readily appreciated by those ordinarily skilled in the art from the disclosure of the present disclosure, according to the present disclosure, existing processes, apparatuses, means, methods or steps and those to be developed in the future which perform substantially the same functions or obtain substantially the same results as the corresponding embodiments herein may be used. Thus, the appended claims intend to include such processes, apparatuses, means, methods or steps within the scope thereof.

Based upon the above descriptions, it can be seen that the disclosure at least discloses the following technical solutions:
Solution 1.

A method for smoothing an image representing foreground or background by performing data filling on the image comprising:
  a dividing step of dividing the image into a plurality of blocks in a specified granularity;
  a filling step of, for a block of the plurality of blocks containing a blank pixel and a non-blank pixel, modifying a value of the blank pixel of the block to a value which is obtained on the basis of a value of the non-blank pixel, so as to obtain a filled block;
  a smoothing step of obtaining the block in which values of pixels are smoothed by performing singular value decomposition on a matrix of pixels of the filled block, wherein values in the matrix of pixels of the block in which values of pixels are smoothed is calculated as a product of the obtained singular value, a left singular vector and a transpose of a right singular vector; and a reconstructing step of, for each of the non-blank pixels in the block in which values of pixels are smoothed, restoring the values of the non-blank pixels to initial values of the non-blank pixels before the filling step, so as to obtain a reconstructed block.

Solution 2.

The method of Solution 1 further comprising:

performing the smoothing step and reconstructing step iteratively until a predetermined convergence condition is satisfied.

Solution 3.

The method of Solution 1 further comprising:

performing the dividing step by using an integral multiple of the specified granularity as the specified granularity, and performing the filling step, smoothing step and reconstructing step by using a blank block of the plurality of blocks which are obtained by performing dividing in the specified granularity and the reconstructed block as the blank pixel and non-blank pixel respectively.

Solution 4.

The method of Solution 3 further comprising:

performing the smoothing step and reconstructing step iteratively until a predetermined convergence condition is satisfied.

Solution 5.

The method of Solution 3 further comprising:

performing the dividing step, filling step, smoothing step and reconstructing step by gradually increasing the integral multiple until all pixels of the image are processed.

Solution 6.

The method of Solution 2 or 4, wherein the predetermined convergence condition is whether a mean-square deviation of pixels of two reconstructed blocks as obtained in two successive iterations is less than a predetermined value.

Solution 7.

The method of Solution 1, before the dividing step, further comprising:

a first converting step of converting the image from an initial image presentation space to a YCbCr image representation space; and a down-sampling step of performing down-sampling on an image in at least one dimension of the dimensions Cb and Cr, so as to obtain a reduced image in the at least one dimension.

Solution 8.

The method of Solution 7, after the reconstructing step, further comprising:

an up-sampling step of restoring an initial size of the reduced image by performing up-sampling on the reduced image; and a second converting step of converting the image, size of which is restored, from the YCbCr image representation space back to the initial image presentation space.

Solution 9.

The method of Solution 1, after the reconstructing step, further comprising:

a Gaussian smoothing step of performing Gaussian smoothing on the image which is reconstructed by the reconstructing step.

Solution 10.

An apparatus for smoothing representing foreground or background an image by performing data filling on the image, comprising:

a dividing part, configured to divide the image into a plurality of blocks in a specified granularity;

a filling part, configured to, for a block of the plurality of blocks containing both a blank pixel and a non-blank pixel, modify a value of the blank pixel of the block to a value which is obtained on the basis of a value of the non-blank pixel, so as to obtain a filled block;

a smoothing part, configured to obtain the block in which values of pixels are smoothed by performing singular value decomposition on a matrix of pixels of the filled block, wherein values in the matrix of pixels of the block in which values of pixels are smoothed is calculated as a product of the obtained singular value, a left singular vector and a transpose of a right singular vector;

a reconstructing part, configured to, for each of the non-blank pixels in the block in which values of pixels are smoothed, restore the values of the non-blank pixels to an initial values before the filling is performed by the filling part of the non-blank pixels, so as to obtain a reconstructed block; and a control part, configured to control the dividing part, the filling part, the smoothing part and the reconstructing part to perform respective operations.

Solution 11.

The apparatus of Solution 10, wherein the control part is configured to control the smoothing part and the reconstructing part to perform operations iteratively, until a predetermined convergence condition is satisfied.

Solution 12.

The apparatus of Solution 10, wherein the control part is configured to control the dividing part to perform an operation by using an integral multiple of the specified granularity as the specified granularity, and to control the filling part, the smoothing part and the reconstructing part to perform operations by using a blank block of the plurality of blocks which are obtained by performing dividing in the specified granularity and the reconstructed block as the blank pixel and non-blank pixel respectively.

Solution 13.

The apparatus of Solution 12, wherein the control part is configured to control the smoothing part and the reconstructing part to perform operations iteratively until a predetermined convergence condition is satisfied.

Solution 14.

The apparatus of Solution 12, wherein the control part is configured to control the dividing part, filling part, smoothing part and reconstructing part to perform operations by gradually increasing the integral multiple, until all pixels of the image are processed.

Solution 15.

The apparatus of Solution 11 or 13, wherein the predetermined convergence condition is whether a mean-square deviation of pixels of two reconstructed blocks as obtained in two successive iterations is less than a predetermined value.

Solution 16.

The apparatus of Solution 10, further comprising:

a first converting part for converting the image from an initial image presentation space to a YCbCr image representation space; and a down-sampling part for performing down-sampling on an image in at least one dimension of the dimensions Cb and Cr, so as to obtain a reduced image in the at least one dimension, and sending the reduced image to the dividing part.

Solution 17.
  The apparatus of Solution 16, further comprising:
    an up-sampling part for restoring an initial size of the reduced image by performing up-sampling on the reduced image; and
    a second converting part for converting the image, size of which is restored, from the YCbCr image representation space back to the initial image presentation space.
Solution 18.
  The apparatus of Solution 10, further comprising:
    a Gaussian smoothing part for performing Gaussian smoothing on the image which is reconstructed by the reconstructing part.
Solution 19.
  A computer program for implementing the method of any one of Solutions 1 to 9.
Solution 20.
  A computer program product in the form of a computer-readable medium, on which a computer program code for implementing the method of any one of Solutions 1 to 9 is recorded.

What is claimed is:

1. A method for smoothing an image representing one of foreground and background by performing data filling on the image, comprising:
  dividing the image into a plurality of blocks at a specified granularity;
  filling a block of the plurality of blocks containing a blank pixel and a non-blank pixel, by modifying a first value of the blank pixel of the block to a second value obtained on the basis of a third value of the non-blank pixel, to obtain a filled block;
  smoothing by obtaining a smoothed block in which values of pixels are smoothed by singular value decomposition on a matrix of pixels of a filled block, wherein values, in the matrix of pixels of the smoothed block in which values of pixels are smoothed, are calculated as a product of an obtained singular value, a left singular vector and a transpose of a right singular vector; and
  reconstructing, for each of the non-blank pixels in the smoothed block in which the values of the pixels are smoothed, by restoring values of the non-blank pixels to initial values of the non-blank pixels before filling to obtain a reconstructed block.

2. The method of claim 1, further comprising:
  performing the smoothing and reconstructing iteratively until a predetermined convergence condition is satisfied.

3. The method of claim 2, wherein the predetermined convergence condition is whether a mean-square deviation of pixels of two reconstructed blocks as obtained in two successive iterations is less than a predetermined value.

4. The method of claim 1, further comprising:
  performing the dividing by using an integral multiple of the specified granularity as the specified granularity; and
  performing the filling, smoothing, and reconstructing by using a blank block of the plurality of blocks obtained by dividing at the specified granularity and the reconstructed block as the blank pixel and non-blank pixel, respectively.

5. The method of claim 4, further comprising:
  performing the smoothing and reconstructing iteratively until a predetermined convergence condition is satisfied.

6. The method of claim 5, wherein the predetermined convergence condition is whether a mean-square deviation of pixels of two reconstructed blocks as obtained in two successive iterations is less than a predetermined value.

7. The method of claim 4, further comprising:
  performing the dividing, filling, smoothing, and reconstructing by gradually increasing the integral multiple until all pixels of the image are processed.

8. The method of claim 1, before dividing, further comprising:
  converting the image from an initial image presentation space to a YCbCr image representation space; and
  down-sampling of an image in at least one dimension of the dimensions Cb and Cr to obtain a reduced image in the at least one dimension.

9. The method of claim 8, after reconstructing, further comprising:
  up-sampling to restore an initial size of the reduced image by up-sampling on the reduced image; and
  converting the image, a size of which is restored, from the YCbCr image representation space back to the initial image presentation space.

10. The method of claim 1, after reconstructing, further comprising:
  Gaussian smoothing on a reconstructed image.

11. An apparatus for smoothing an image representing one of foreground and background by performing data filling on the image, comprising:
  a divider configured to divide the image into a plurality of blocks at a specified granularity;
  a filler configured to, for a block of the plurality of blocks containing a blank pixel and a non-blank pixel, modify a first value of the blank pixel of the block to a second value obtained on the basis of a third value of the non-blank pixel to obtain a filled block;
  a smoother configured to obtain a smoothed block in which values of pixels are smoothed by singular value decomposition on a matrix of pixels of a filled block, wherein values, in the matrix of pixels of the smoothed block in which values of pixels are smoothed, are calculated as a product of the obtained singular value, a left singular vector and a transpose of a right singular vector;
  a reconstructor configured to, for each of the non-blank pixels in the smoothed block in which values of pixels are smoothed, restore values of the non-blank pixels to an initial values of the non-blank pixels before filling is performed by the filler, so as to obtain a reconstructed block; and
  a controller configured to control the divider, the filler, the smoother, and the reconstructer to perform respective operations.

* * * * *